(12) United States Patent
Liu et al.

(10) Patent No.: US 12,429,623 B2
(45) Date of Patent: Sep. 30, 2025

(54) RADIATION INSPECTION DEVICE

(71) Applicant: NUCTECH COMPANY LIMITED, Beijing (CN)

(72) Inventors: Lei Liu, Beijing (CN); Zheng Ji, Beijing (CN); Shangmin Sun, Beijing (CN); Chunguang Zong, Beijing (CN); Yu Hu, Beijing (CN); Yuan Ma, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 159 days.

(21) Appl. No.: 18/260,037

(22) PCT Filed: Dec. 9, 2021

(86) PCT No.: PCT/CN2021/136709
§ 371 (c)(1),
(2) Date: Jun. 30, 2023

(87) PCT Pub. No.: WO2022/143072
PCT Pub. Date: Jul. 7, 2022

(65) Prior Publication Data
US 2024/0069240 A1 Feb. 29, 2024

(30) Foreign Application Priority Data
Dec. 31, 2020 (CN) .......................... 202011639191.8

(51) Int. Cl.
*G01V 5/00* (2024.01)
*G01N 23/10* (2018.01)
*G01V 5/22* (2024.01)

(52) U.S. Cl.
CPC ............... *G01V 5/22* (2024.01); *G01N 23/10* (2013.01); *G01N 2223/643* (2013.01)

(58) Field of Classification Search
None
See application file for complete search history.

(56) References Cited

U.S. PATENT DOCUMENTS 10,416,340 B2 * 9/2019 Karas ..................... G01V 5/20
2015/0325401 A1 * 11/2015 Langeveld .............. H01J 35/32
378/57

FOREIGN PATENT DOCUMENTS

CN 101051029 A 10/2007
CN 101162206 A 4/2008
(Continued)

OTHER PUBLICATIONS

ISR received in PCT/CN2021/136709; mailed Mar. 1, 2022.
(Continued)

*Primary Examiner* — Hoon K Song
(74) *Attorney, Agent, or Firm* — Kilpatrick Townsend & Stockton LLP

(57) ABSTRACT

The present disclosure provides a radiation inspection device, which has a transportation state and a working state, and includes a container with an adjustable width, and the width of the container in the transportation state is smaller than that in the working state; a radiation inspection apparatus arranged in the container and including a radiation source and a detector, and in the transportation state, the length of the radiation inspection apparatus is arranged along the length direction of the container, and in the working state, the length of the radiation inspection apparatus is arranged along the width direction of the container to perform radiation scanning inspection on vehicles passing through the container along the length direction; a rotating apparatus arranged in the container and configured to rotate the radiation inspection apparatus when the radiation inspection device is switched between the transportation state and the working state.

14 Claims, 7 Drawing Sheets

(56) References Cited

FOREIGN PATENT DOCUMENTS

| | | |
|---|---|---|
| CN | 103026214 A | 4/2013 |
| CN | 106596599 A | 4/2017 |
| CN | 109521481 A | 3/2019 |
| CN | 109633768 A | 4/2019 |
| CN | 110286414 A | 9/2019 |
| CN | 209400713 U | 9/2019 |
| CN | 110456421 A | 11/2019 |

OTHER PUBLICATIONS

First OA received in CN Application No. 202011639191.8; mailed Aug. 4, 2023.
Second OA received in CN Application No. 202011639191.8; mailed Dec. 11, 2023.

* cited by examiner

RADIATION INSPECTION DEVICE

CROSS-REFERENCES TO RELATED APPLICATIONS

The present disclosure is a national phase application of International Application No. PCT/CN2021/136709, filed on Dec. 9, 2021, which claims priority to China application number 202011639191.8, filed on Dec. 31, 2020, the entireties of which are herein incorporated by reference.

FIELD

The present disclosure relates to the field of radiation inspection, in particular to a radiation inspection device.

BACKGROUND

In the field of safety inspection, containers, vehicles and other objects are often inspected by radiation. The radiation inspection device uses radiation to scan the object, and the detector receives the radiation reflected or transmitted by the object for imaging, to inspect the object. With the development of society, there are more and more sites that need safety inspection, and the requirements for flexible and fast transfer of radiation inspection device are getting higher and higher.

SUMMARY

The object of the present disclosure is to provide a radiation inspection device capable of fast transition.

The application discloses radiation inspection device, which has a transportation state and a working state, and includes
- a container with an adjustable width, and a width of the container in the transportation state is smaller than that in the working state;
- a radiation inspection apparatus arranged in the container and including a radiation source and a detector, and in the transportation state, a length of the radiation inspection apparatus is arranged along a length direction of the container; in the working state, the length of the radiation inspection apparatus is arranged along a width direction of the container to perform radiation scanning inspection on a vehicle passing through the container along the length direction; and
- a rotating apparatus arranged in the container and configured to rotate the radiation inspection apparatus when the radiation inspection device is switched between the transportation state and the working state.

In some embodiments, the container includes a bottom wall, a top wall, a left wall and a right wall extending along the length direction of the container; the left wall and the right wall are oppositely arranged along the width direction of the container; the radiation inspection device further includes a driving apparatus configured to adjust the distance between the left wall and the right wall to adjust the width of the container when the radiation inspection device is switched between the transportation state and the working state.

In some embodiments, the radiation inspection device further includes a first sliding part and a second sliding part which are located at both ends of the bottom wall and are respectively slidably connected with the bottom wall, and the first sliding part is connected with the left wall, and the second sliding part is connected with the right wall; the driving apparatus is drivingly connected with the first sliding part and the second sliding part, and is configured to drive the first sliding part and the second sliding part to slide relative to the bottom wall to adjust the width of the container.

In some embodiments, the radiation inspection device includes a conveying apparatus arranged in the container, and the conveying apparatus is configured to convey a vehicle entering the container in the working state so that the vehicle passes through a radiation scanning channel of the radiation inspection apparatus.

In some embodiments, the conveying apparatus includes a first conveyor and a second conveyor extending along a length direction of the container; the first conveyor and the second conveyor are arranged at intervals along a width direction of the container, and a distance between the first conveyor and the second conveyor is adjustable.

In some embodiments, the container includes a bottom wall, a top wall, a left wall and a right wall extending along the length direction of the container; the left wall and the right wall are oppositely arranged along the width direction of the container; a distance between the left wall and the right wall is adjustable; the container further includes a first supporting part and a second supporting part fixedly connected with the left wall and the right wall respectively, and the radiation inspection apparatus is supported on the first supporting part and the second supporting part in the working state; the rotating apparatus includes a rotating part and a support frame arranged on the container; in the transportation state, the support frame is detachably connected between the rotating part and the radiation inspection apparatus; the radiation inspection apparatus is supported on the support frame, and the rotating part is configured to provide power for rotating the radiation inspection apparatus; when the radiation inspection device is switched between the transportation state and the working state, the rotating part rotates the radiation inspection device through the support frame.

In some embodiments, the support frame includes a plurality of follow-up legs, and the follow-up legs are supported on the bottom wall in the transportation state.

In some embodiments, the first supporting part and the second supporting part both include arc-shaped guide rails, and the arc-shaped guide rail includes a fixed guide rail fixedly connected with the container and an extending guide rail detachably connected with the fixed guide rail; the extending guide rail is separated from the fixed guide rail and the radiation inspection apparatus, and is fixedly connected with the fixed guide rail when the radiation inspection device is switched between the transportation state and the working state; the fixed guide rail and the extending guide rail guide the rotation of the radiation inspection apparatus.

In some embodiments, the radiation inspection apparatus includes a first cabin located at the top of the container, and a first support arm and a second support arm which support the first cabin and are located at two ends of the first cabin; the first support arm and the second support arm are configured to be adjustable in height so that the position of the first cabin in the transportation state is lower in height than that in the working state.

In some embodiments, the first support arm and the second support arm both include a first articulated arm and a second articulated arm which can slide relatively, and the first support arm and the second support arm adjust their respective heights through the relative sliding of the respective first articulated arm and second articulated arm).

In some embodiments, the container includes a bottom wall, a top wall, a left wall and a right wall extending along the length direction, and the left wall and the right wall are oppositely arranged along the width direction of the container; the top wall includes a multiple separate top plates, and one end of the top plate corresponding to the radiation inspection apparatus is hinged with one of the left wall and the right wall, and the other end of the top plate is detachably connected with the other of the left wall and the right wall.

In some embodiments, the radiation inspection apparatus includes a first cabin located at the top of the container, and the size of the first cabin in the width direction of the container is adjustable.

In some embodiments, the first cabin includes a first sub-cabin, a second sub-cabin and a third sub-cabin which are connected in sequence; the radiation source is arranged in the second sub-cabin; both the first sub-cabin and the third sub-cabin can slide relative to the second sub-cabin, and the first cabin slides relative to the second sub-cabin through the first sub-cabin and/or the third sub-cabin to adjust the size of the first cabin in the width of the container.

In some embodiments, the wall of the container is a radiation-proof wall.

Based on the radiation inspection device provided by the disclosure, by arranging the radiation inspection device in the container, the transition of the radiation inspection device can be more convenient and faster. At the same time, by setting the width of the container to be adjustable, and arranging the radiation inspection devices in the working state and the transportation state in different directions, the radiation inspection device can meet the requirements of normal radiation inspection in the working state, and at the same time, the radiation inspection device can be more compact in the transportation state, which is convenient for transportation transition.

Other embodiments of the present disclosure will become clear from the following detailed description of exemplary embodiments of the present disclosure with reference to the accompanying drawings.

BRIEF DESCRIPTION OF THE DRAWINGS

The accompanying drawings described herein are provided to provide a further understanding of the disclosure and constitute a part of this application. The illustrative embodiments of the disclosure and the description thereof are configured to explain the disclosure and do not constitute undue limitations on the disclosure. In the attached drawings.

DETAILED DESCRIPTION OF THE DISCLOSURE

Figure 1:
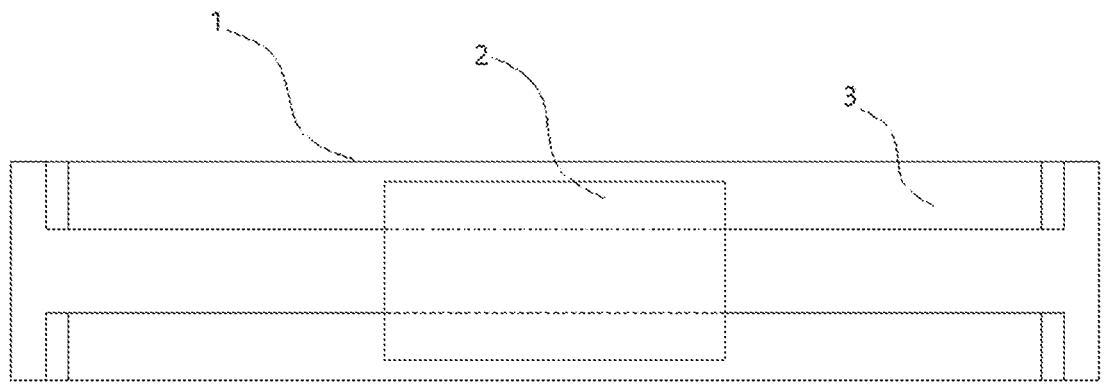
FIG. 1 is a partial structural schematic diagram of a radiation inspection device in a transportation state according to an embodiment of the present disclosure.

The embodiment of the disclosure will be clearly and completely described with reference to the attached drawings. Obviously, the described embodiment is only a part of the embodiment of the disclosure, but not the whole embodiment. The following description of at least one exemplary embodiment is merely illustrative in nature and is in no way intended to limit the disclosure, its application or uses.

Unless otherwise specified, the relative arrangement of components and steps, numerical expressions and numerical values set forth in these embodiments do not limit the scope of the present disclosure. At the same time, it should be understood that for the convenience of description, the dimensions of various parts shown in the drawings are not drawn according to the actual scale relationship. Techniques, methods and equipment known to ordinary people in the relevant fields may not be discussed in detail, but in appropriate cases, they should be regarded as part of the authorization specification. In all examples shown and discussed herein, any specific values should be interpreted as illustrative only and not as a limitation. Therefore, other examples of exemplary embodiments may have different values. It should be noted that similar numbers and letters indicate similar items in the following drawings, so once an item is defined in one drawing, it does not need to be further discussed in subsequent drawings.

For the convenience of description, spatially relative terms such as "on", "above", "on the upper surface of" and "upper" can be used here to describe the spatial positional relationship between a device or feature as shown in the FIG. and other devices or features. It should be understood that spatially relative terms are intended to encompass different orientations in use or operation in addition to the orientation of the device depicted in the drawings. For example, if the devices in the drawings are inverted, devices described as "on" or "above" other devices or structures will be positioned as "under" or below" other devices or structures. Thus, the exemplary term "above" can include both directions of "above" and "below". The device can also be positioned in other different ways (rotated by 90 degrees or in other orientations), and the spatial relative description used here is explained accordingly.

In the following embodiments, "rear" refers to the direction in which the vehicle 100 undergoing radiation inspection enters the container 1, and "front" refers to the direction in which the vehicle 100 undergoing radiation scanning inspection leaves the container 1; "left" refers to the direction of the operator's left when the operator faces the front of the container 1 from the rear, and "right" refers to the direction of the operator's right when the operator faces the front of the container 1 from the rear; "up" and "down" are the up and down directions in space; "top view" refers to viewing from above to below the radiation inspection device, "left view" refers to viewing from the front to the back of the radiation inspection device, and "front view" refers to viewing from the left side to the right side of the radiation inspection device. The length of the container refers to the length of the container in the front and back direction, and the width direction of the container refers to the length of the container in the left and right direction.

As shown in FIGS. 1 to 13, the radiation inspection device of this embodiment has a transportation state and a working state, and the radiation inspection device includes a container 1, a radiation inspection apparatus 2 and a rotating apparatus 4.

Figure 2:
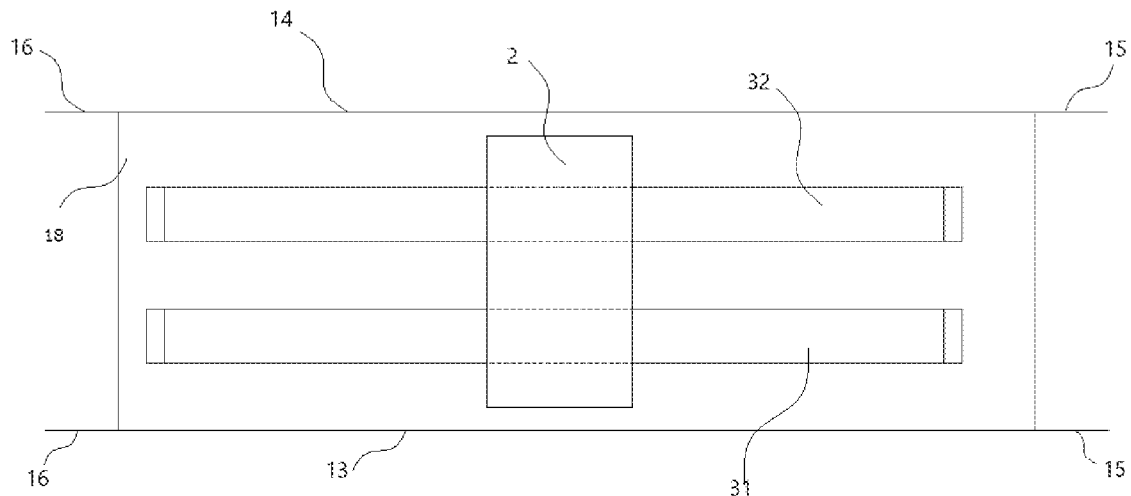
FIG. 2 is a schematic structural view of part of the radiation inspection device shown in FIG. 1 when viewed from the top in the working state.
Figure 3:
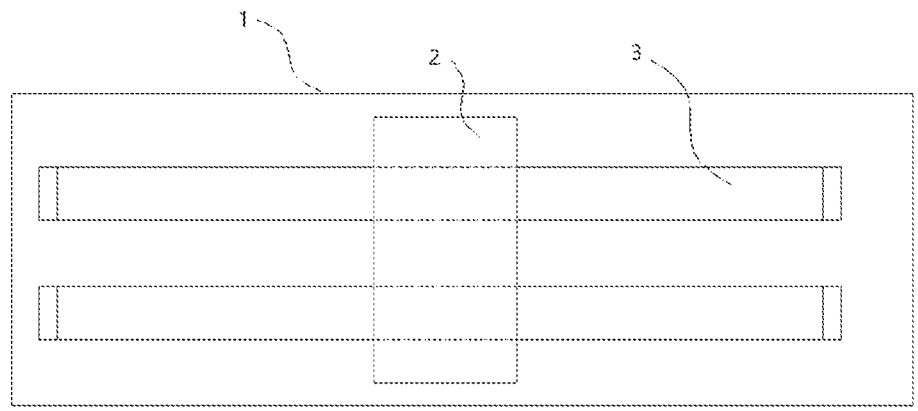
FIG. 3 is a schematic structural view of the radiation inspection device shown in FIG. 1 in a top view during the switching process between the working state and the transportation state.

The width of the container 1 is adjustable. As shown in FIGS. 1 and 2, the width of the container 1 in the transportation state is smaller than that in the working state.

The radiation inspection apparatus 2 is arranged in the container 1. The radiation inspection apparatus 2 includes a radiation source 24 and a detector. The radiation inspection apparatus 2 is configured to perform radiation scanning inspection on a vehicle 100 passing through the interior of the container 1. In the transportation state, as shown in FIG. 1, the length of the radiation inspection apparatus 2 is set along the length direction of the container 1, that is, the length direction of the radiation inspection apparatus 2 is consistent with the length direction of the container 1. At this time, the width of the container 1 is adjustable to be smaller, and the radiation inspection device has a compact structure and is convenient for transportation. In the working state, as shown in FIG. 2, the width of the container 1 is adjustable to be larger, and the length of the radiation inspection apparatus 2 is set along the width direction of the container 1 to perform radiation scanning inspection on the vehicle 100 passing through the container 1 along the length direction, that is, the length direction of the radiation inspection apparatus 2 is consistent with the width direction of the container 1.

The rotating apparatus 4 is arranged in the container 1 and is configured to rotate the radiation inspection apparatus 2 when the radiation inspection device is switched between the transportation state and the working state. When the radiation inspection device is switched between the transportation state and the working state, the rotating apparatus 4 is connected with the radiation inspection apparatus 2 in a driving way, and the length of the radiation inspection apparatus 2 can be switched between being arranged along the length direction of the container 1 and being arranged along the width direction of the container 1 by rotating the radiation inspection apparatus 2 by the rotating apparatus 4.

In the radiation inspection device of this embodiment, the radiation inspection apparatus 2 is arranged in the container 1, so that the transition of the radiation inspection device is more convenient and faster. At the same time, the width of the container 1 is adjustable, and the radiation inspection apparatus 2 is arranged in different directions in the working state and the transportation state, so that the radiation inspection device can meet the requirements of normal radiation inspection in the working state, and at the same time, the structure of the radiation inspection device can be more compact in the transportation state, which is convenient for transportation transition.

In some embodiments, as shown in FIGS. 1 to 5, the container 1 includes a bottom box ball 17, a top box ball 18, a left box ball 13 and a right box ball 14; the left box ball 13 and the right box ball 14 are opposite and arranged in the width direction of the container 1. The bottom wall 17, the top wall 18, the left wall 13 and the right wall 14 of the container 1 can be of a box plate structure of a conventional container. The radiation inspection device further includes a driving apparatus 5 provided on the bottom wall 17, and the driving apparatus 5 is configured to adjust the distance between the left wall 13 and the right wall 14 to adjust the width of the container 1 when the radiation inspection device is switched between the transportation state and the working state.

Figure 4:
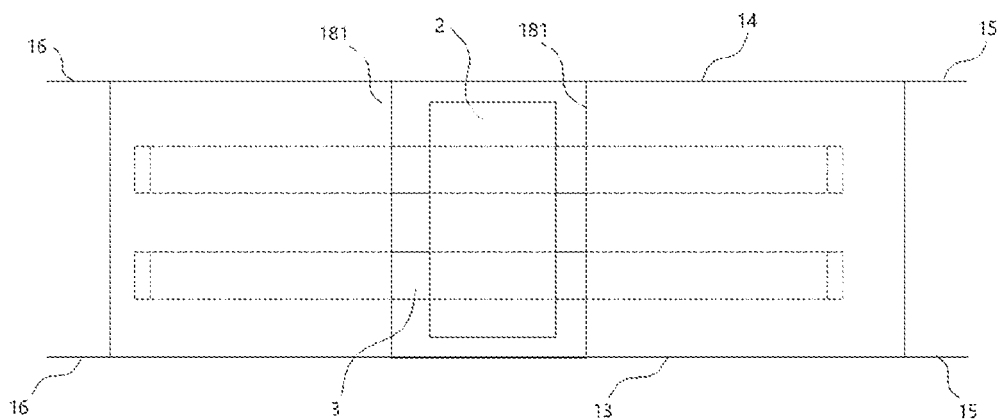
FIG. 4 is a partial structural schematic diagram of radiation inspection device in a top view in a working state according to another embodiment of the present disclosure.
Figure 5:
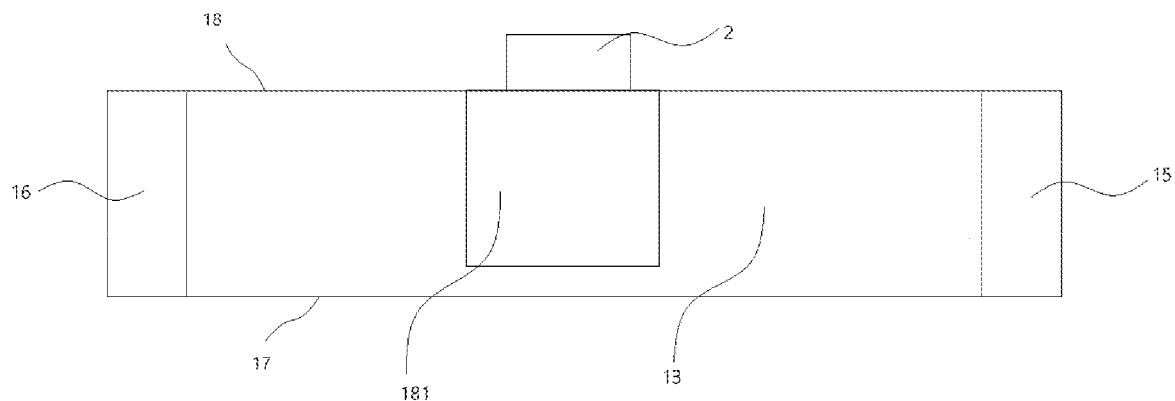
FIG. 5 is a partial structural schematic view of the front view of the radiation inspection device shown in FIG. 4 in the working state.

In some embodiments, the container 1 further includes a front door 16 and a back door 15. The front door 16 is configured to close or open the container 1 from the front, and the back door 15 is configured to close or open the container 1 from the rear. As shown in FIG. 2, FIG. 4 and FIG. 5, the front door 16 and the back door 15 are opposite doors, that is, the front door 16 and the back door 15 respectively include a door hinged with the left wall 13 and a door hinged with the right wall 14. In the transportation state, both doors of the front door 16 and the back door 15 are closed, to close the container 1. In the working state, both the front door 16 and the back door 15 are open, so that the vehicle 100 can enter the container 1 through the back door 15 and leave the container 1 through the front door after radiation scanning inspection. In some embodiments not shown in the drawings, the front door 16 and the back door 15 may each include only one door hinged with the left wall 13 or the right wall 14, and the container 1 can be opened and closed by the rotation of one door.

Figure 6:
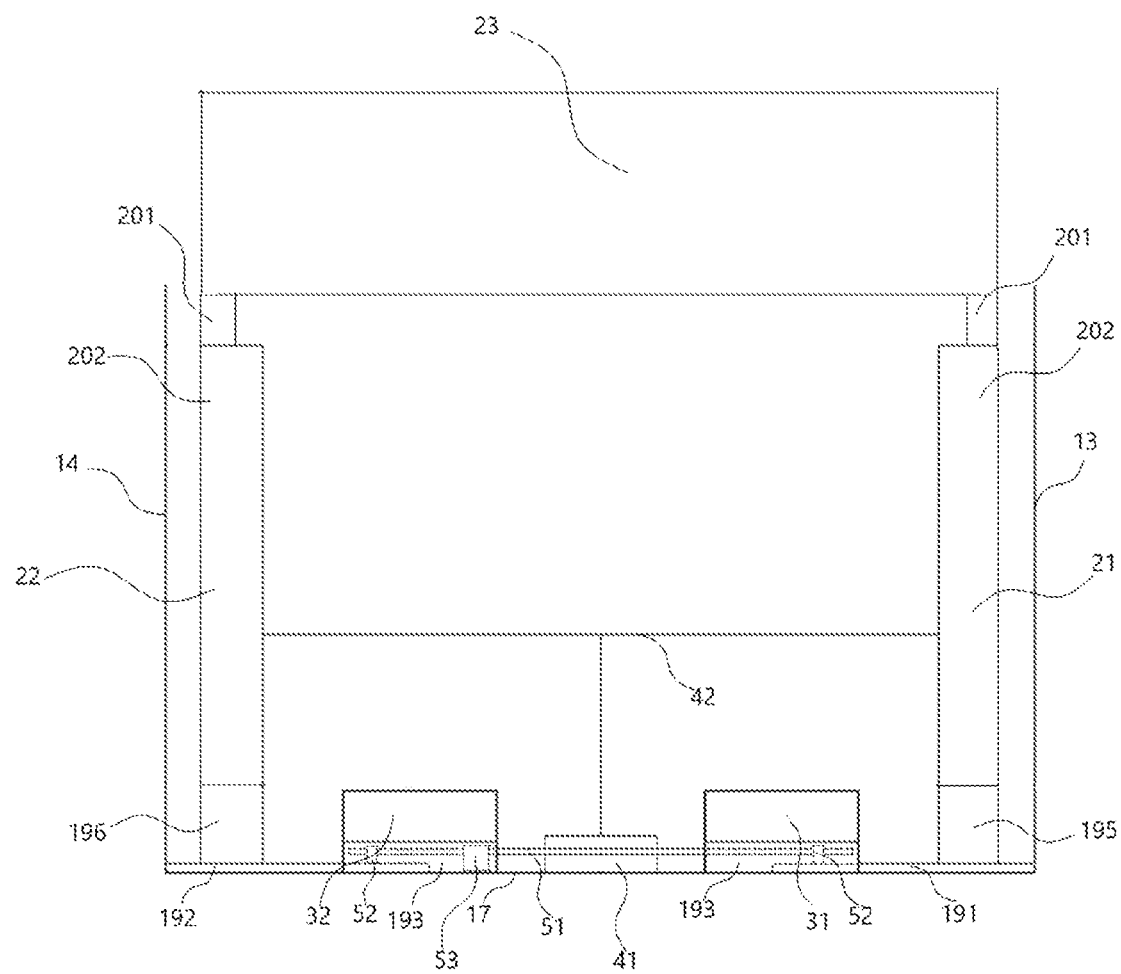
FIG. 6 is a partial structural schematic view from the left in the process of switching the radiation inspection device between the working state and the transportation state according to another embodiment of the present disclosure.
Figure 7:
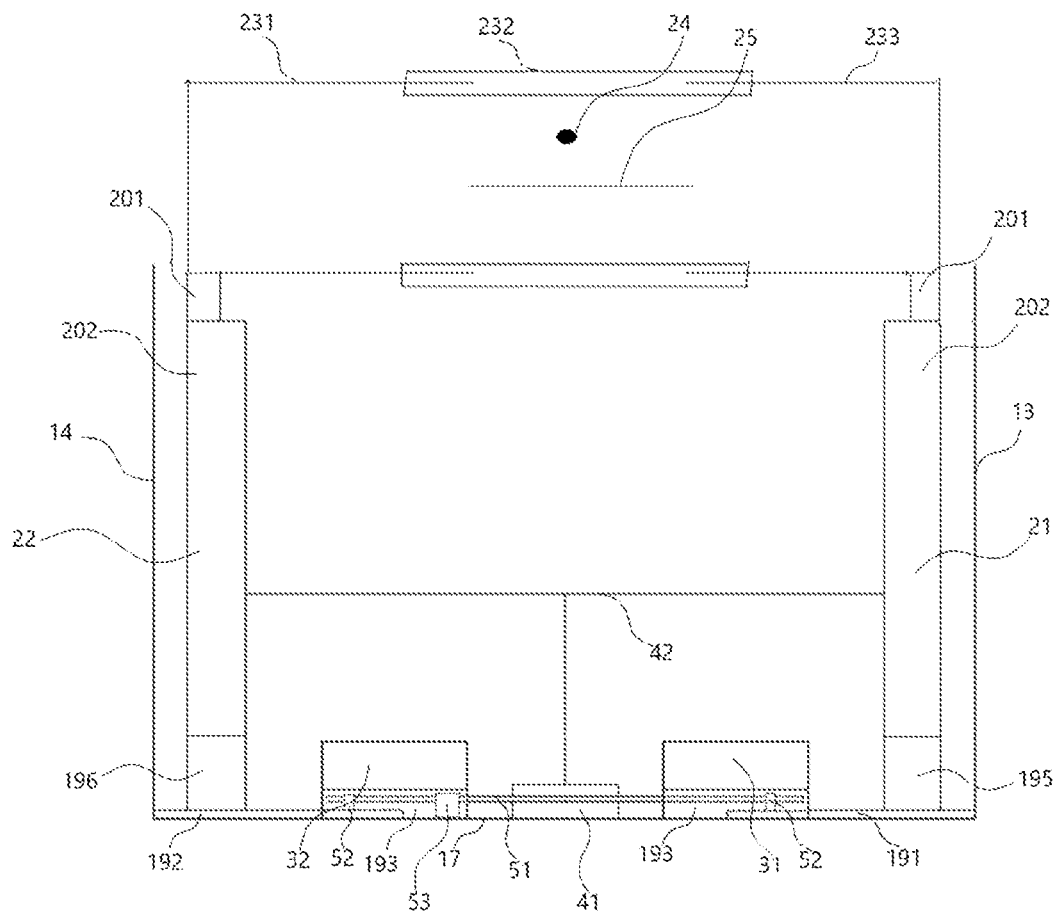
FIG. 7 is a partial structural schematic view from the left in the process of switching the radiation inspection device between the working state and the transportation state according to another embodiment of the present disclosure.
Figure 10:
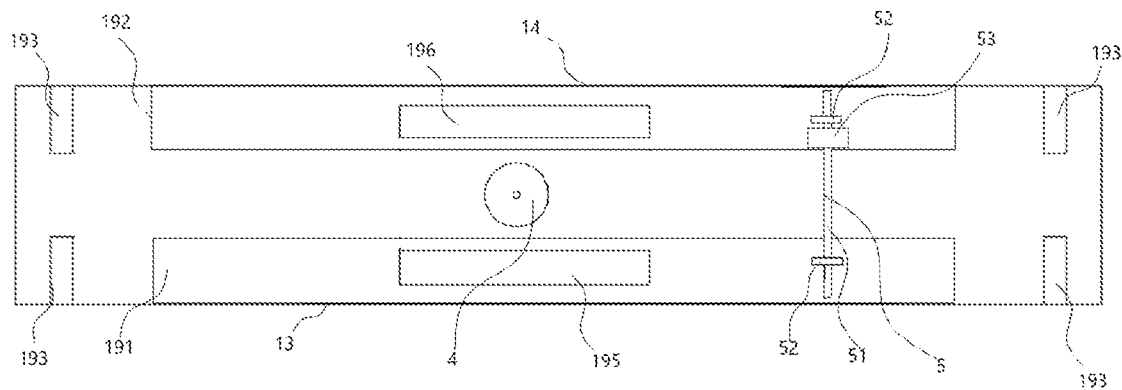
FIG. 10 is a partial structural schematic diagram of radiation inspection device in a transportation state according to another embodiment of the present disclosure.

In some embodiments, as shown in FIGS. 6, 7 and 10, the radiation inspection device further includes a first sliding part 191 and a second sliding part 192 which are located at both ends of the bottom wall 17 and are respectively slidably connected with the bottom wall 17. The first sliding part 191 is connected with the left wall 13 and the second sliding part 192 is connected with the right wall 14; the driving apparatus is respectively connected with the first sliding part 191 and the second sliding part 192 in a driving way. The driving apparatus is configured to drive the first sliding part 191 and the second sliding part 192 to slide relative to the bottom wall 17 to adjust the width of the container 1. The driving apparatus drives the first sliding part 191 and the second sliding part 192 to move, that is, it drives the left wall 13 connected with the first sliding part 191 and the right wall 14 connected with the second sliding part 192 to move, to adjust the distance between the left wall 13 and the right wall 14. The first sliding part 191 may be a plate fixedly connected with the left wall 13, and the second sliding part 192 may be a plate fixedly connected with the right wall 14. The first sliding part 191 can be arranged to overlap with the bottom wall 17, and the relative sliding between the first sliding part 191 and the bottom wall 17 is realized by driving the first sliding part 191 by the driving apparatus to overcome the sliding friction between the first sliding part 191 and the bottom wall 17. A guide rail can also be provided between the first sliding part 191 and the bottom wall 17, and the relative sliding between the first sliding part 191 and the bottom wall 17 can be realized by sliding the guide rail. The structural relationship between the second sliding part 192 and the bottom wall 17 can refer to the first sliding part 191.

In the embodiment shown in FIGS. 6 and 7, the driving apparatus 5 includes a driving motor 53, a lead screw 51 driven by the driving motor to rotate, and two nuts 52 in threaded engagement with the lead screw 51, and one nut 52 is fixedly connected with the first sliding part 191 and the other nut 52 is fixedly connected with the second sliding part 192. The driving motor 53 drives the lead screw 51 to rotate, and the rotation of the lead screw 51 can drive the two nuts to approach or move away from each other, so that the first sliding part 191 and the second sliding part 192 can be driven to slide relative to the bottom wall 17 through the action of the lead screw nut pair, to adjust the distance between the left wall 13 and the right wall 14.

In some embodiments not shown in the drawings, the driving apparatus includes a first driving cylinder connected with the first sliding part 191 in a driving way and a second driving cylinder connected with the second sliding part 192 in a driving way. The first sliding part 191 and the second sliding part 192 can be driven to slide relative to the bottom wall 17 by the expansion and contraction of the first driving cylinder and the second driving cylinder.

In some embodiments, as shown in FIGS. 1 to 4 and 6 to 7, the radiation inspection device includes a conveying apparatus 3 arranged in the container 1, and the conveying apparatus 3 is configured to convey a vehicle 100 entering the container 1 in a working state so that the vehicle 100 passes through a radiation scanning channel of the radiation inspection apparatus 2. The conveying apparatus 3 is configured and then when the vehicle 100 is inspected in the working state, it is only necessary to drive the vehicle 100 to the entrance of the container 1, and then the driver can leave, the conveying apparatus 3 can automatically convey the vehicle 100 through the radiation scanning channel of the radiation inspection apparatus 2, to realize the automation of radiation scanning inspection and reduce the radiation to the driver. In some embodiments, the conveying apparatus includes a plate chain conveyor, a roller conveyor and other conveying mechanisms.

In some embodiments, as shown in FIGS. 1 to 8, the conveying apparatus 3 includes a first conveyor 31 and a second conveyor 32 extending along the length direction of the container 1; the first conveyor 31 and the second conveyor 32 are arranged at intervals along the width direction of the container 1, and the interval distance between the first conveyor 31 and the second conveyor 32 is adjustable. In this embodiment, the interval distance between the first conveyor 31 and the second conveyor 32 is adjustable for vehicles 100 with different widths, so that the conveying apparatus can convey vehicles 100 with different widths more smoothly and appropriately. In some embodiments, the first conveyor 31 and the second conveyor 32 may be conveyor mechanisms such as plate chain conveyors and roller conveyors.

In the embodiment shown in FIGS. 6 to 9, the first conveyor 31 and the second conveyor 32 are arranged on the conveyor support structure 193. As shown in the figure, the conveyor support structure 193 includes two support blocks respectively located on the left and right sides in the front of the container 1 and two support blocks respectively located on the left and right sides in the back of the container 1. After the conveyor support structure 193 is provided, the driving apparatus, the first sliding part 191, the second sliding part 192 and other structures of the above embodiment can be arranged below the first conveyor 31 and the second conveyor 32, thus avoiding the interference between the above structures and the conveyor 3.

In some embodiments, as shown in FIGS. 6 to 13, the container 1 includes a bottom wall 17, a top wall 18, a left wall 13 and a right wall 14 extending along the length direction; the left wall 13 and the right wall 14 are arranged oppositely along the width direction of the container 1, and the distance between the left wall 13 and the right wall 14 is adjustable. The container 1 further includes a first supporting part 195 and a second supporting part 196 fixedly connected with the left box ball 13 and the right box ball 14, respectively. In the working state, the radiation inspection apparatus 2 is supported on the first supporting part 195 and the second supporting part 196. The rotating apparatus 4 includes a rotating part 41 and a support frame 42 arranged on the container 1. In the transportation state, the support frame 42 is detachably connected between the rotating part 41 and the radiation inspection apparatus 2, and the radiation inspection apparatus 2 is supported on the support frame 42. The rotating part 41 is configured to provide power for rotating the radiation inspection apparatus 2, and when the radiation inspection device is switched between the transportation state and the working state, the rotating part 41 rotates the radiation inspection apparatus 2 through the support frame 42.

The first supporting part 195 and the left wall 13 can be fixedly connected by direct connection, or as shown in FIG. 10, the first supporting part 195 is fixedly connected with the first sliding part 191, and the first sliding part 191 is fixedly connected with the left wall 13, and the first supporting part 195 is indirectly connected with the left wall 13 to realize fixed connection, and the second supporting part 196 is fixedly connected with the right wall 14 in the same way.

In the transportation state, the support frame 42 is connected with the rotating part 41 in a driving way, and the radiation inspection apparatus 2 is supported on the support frame 42. When the transportation state is switched to the working state, the rotating part 41 drives the support frame 42 to rotate, and the support frame 42 drives the radiation inspection apparatus 2 to rotate. When the radiation inspection apparatus 2 is rotated to two ends to be supported by the first supporting part 195 and the second supporting part 196 respectively, since the support frame 42 is detachably connected with the rotating part 41 and the radiation inspection apparatus 2, the support frame 42 can be removed at this time, which avoids the interference of the support frame 42 with the vehicle 100 passing the radiation scanning inspection when the vehicle 100 is inspected by the conveying apparatus. When switching from the working state to the transportation state, the support frame 42 can be installed between the rotating part 41 and the radiation inspection apparatus 2, and then the radiation inspection apparatus 2 can be rotated along the length direction of the container 1 by rotating the support frame 42 through the rotating part 41 and supported on the support frame 42. The support frame 42 may have a T-shaped structure. For example, the support frame 42 may include a support plate located at the top and a support rod located below the support plate and fixedly connected with the support plate. The support plate is configured to be detachably connected with the radiation inspection apparatus 2, and the support rod is detachably connected with the rotating part 41. The shape of the support plate can be set according to the need of supporting the radiation inspection apparatus 2, for example, it can be set as a rectangular plate, or it can be set as a circular plate as shown in FIG. 8, and the cross-sectional shape of the support rod is, for example, circular.

Figure 8:
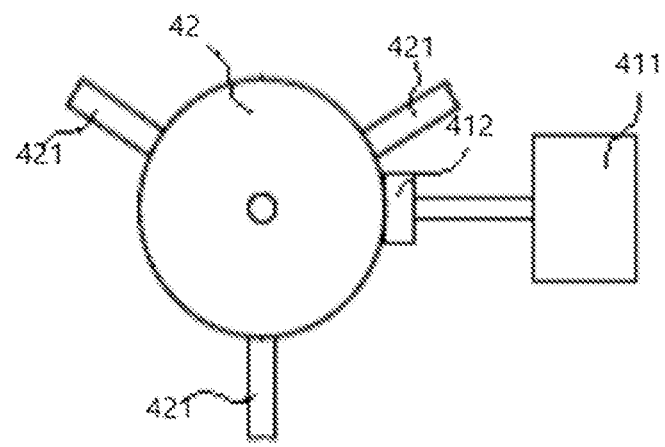
FIG. 8 is a partial structural schematic diagram of a rotating apparatus of radiation inspection device according to another embodiment of the present disclosure.

In some embodiments, as shown in FIG. 8, the support frame 42 includes a plurality of follow-up legs 421, which are supported on the bottom wall 17 in the transportation state. When the transportation state is switched to the working state, the rotating part 41 rotates the support frame 42, which drives the radiation inspection apparatus 2 to rotate, and the follow-up leg 421 of the support frame 42 also rotates on the bottom wall 17. In some embodiments, the follower leg 421 includes a leg column and a universal wheel provided at the end of the leg column. Setting the follow-up legs 421 helps the support frame 42 to support the radiation inspection apparatus 2 more stably.

In some embodiments, as shown in FIG. 8, the rotating apparatus 4 includes a rotating motor 411 and a transmission apparatus 412 connected with the rotating motor 411. The rotating motor 411 drives the rotating part 41 to rotate through the transmission apparatus 412. The transmission apparatus 412 is a gear transmission apparatus, for example, and may include a first gear whose rotation axis is parallel to that of the rotating part 41, and the first gear is driven by the rotating motor 411 to rotate. The rotating part 41 is a second gear meshed with the first gear, and the diameter of the second gear may be larger than the first gear. In the transportation state, the rotating part 41 is fixedly connected with the support frame 42.

In some embodiments not shown in the drawings, the rotating apparatus 4 may also include hydraulic driving apparatuses such as rotary cylinders and rotary motors.

Figure 11:
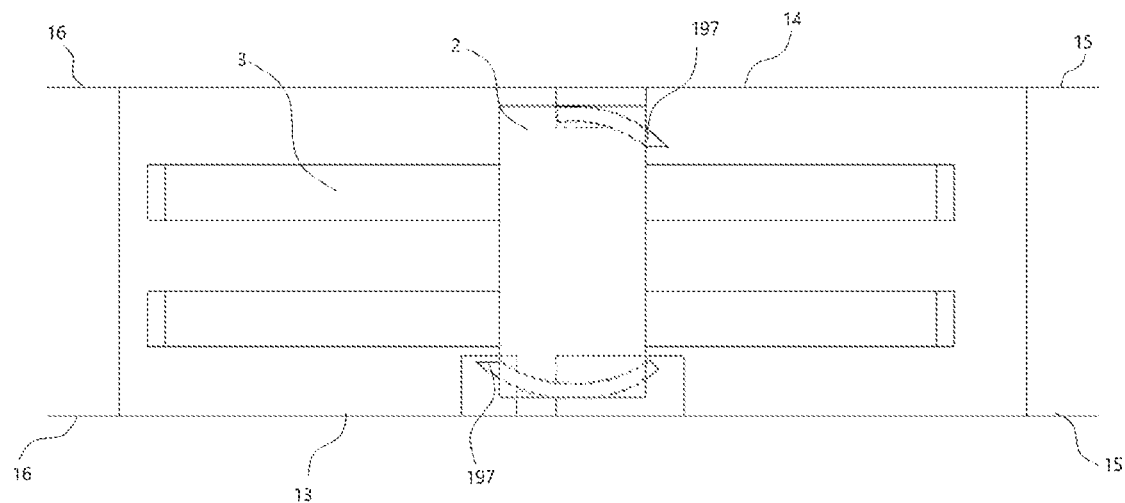
FIG. 11 is a partial structural schematic diagram of the radiation inspection device in the top view in the working state according to another embodiment of the present disclosure.
Figure 12:
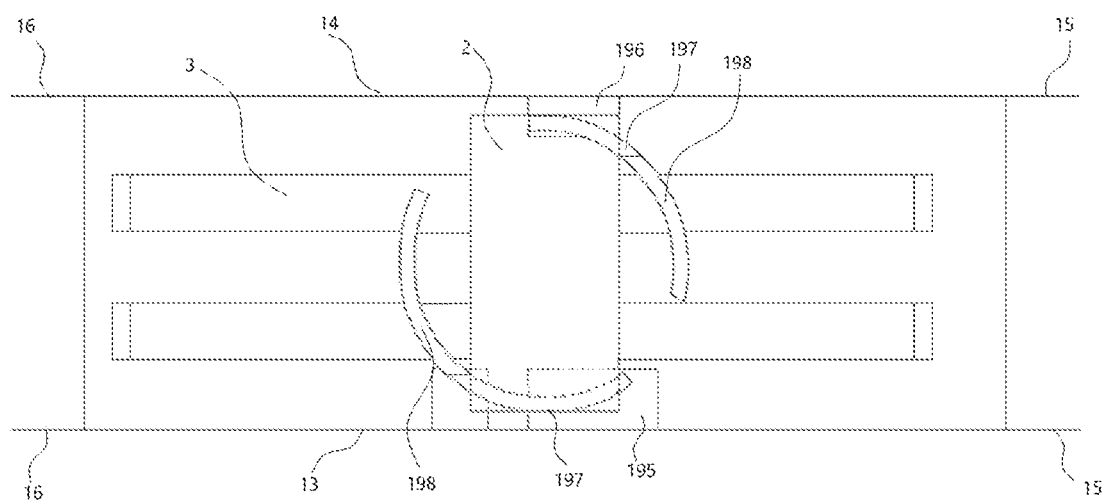
FIG. 12 is a schematic structural view of the radiation inspection device shown in FIG. 11 in the process of switching from the working state to the transportation state.
Figure 13:
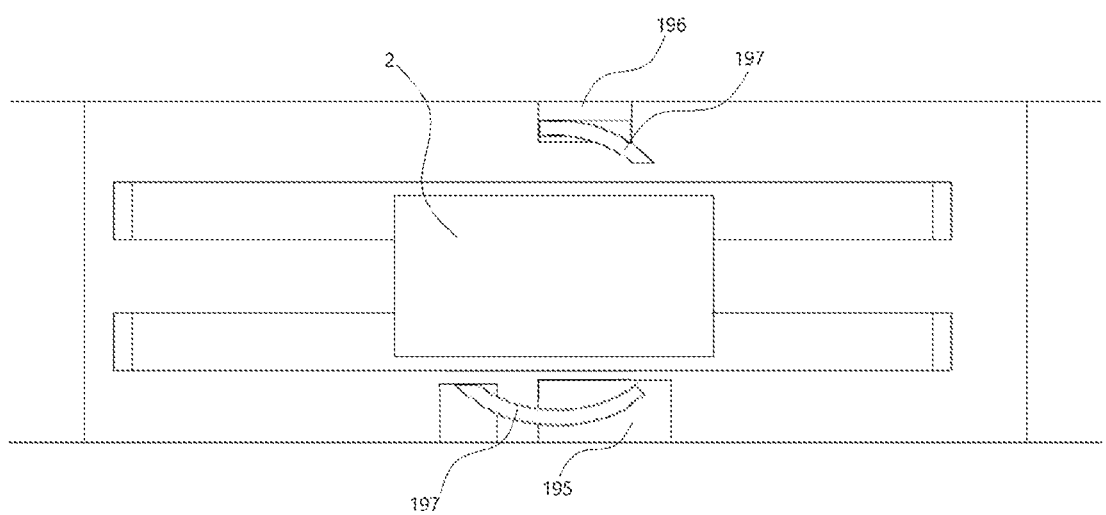
FIG. 13 is a schematic structural view of the radiation inspection device shown in FIG. 11 in the process of switching from the working state to the transportation state.

In some embodiments, as shown in FIGS. 11 to 13, both the first support part 195 and the second support part 196 include arc-shaped guide rails, which include a fixed guide rail 197 fixedly connected with the container 1 and an extending guide rail 198 detachably connected with the fixed guide rail 197, and the extending guide rail 198 is separated from the fixed guide rail 197 and the radiation inspection apparatus 2 in the transportation state and the working state. When the radiation inspection device is switched between the transportation state and the working state, the extending guide rail 198 is fixedly connected with the fixed guide rail 197. The fixed guide rail 197 and the extending guide rail 198 guide the rotation of the radiation inspection apparatus 2.

The fixed guide rail 197 is always fixedly connected with the container 1. As shown in FIG. 11, when switching between the working state and the transportation state, the fixed guide rail 197 is connected with the extending guide rail 198. A slide block is arranged at the bottom of the radiation inspection apparatus 2, and the radiation inspection apparatus 2 is connected with the arc-shaped guide rail through the slide block, so that the radiation inspection apparatus 2 can slide on the arc-shaped guide rail through the slide block when rotating. The arc-shaped guide rail guides the rotation of the radiation inspection apparatus 2. As shown in FIG. 12, after switching from the transportation state to the working state, the extending guide rail 198 can be removed to avoid interference between the extending guide rail 198 and the inspection vehicle 100 when the radiation inspection apparatus 2 performs inspection work. The radiation inspection apparatus 2 is supported on fixed guide rails 197 at both ends.

As shown in FIG. 13, when the radiation inspection apparatus 2 is switched from the working state to the transportation state, the extending guide rail 198 can be removed along the length direction of the container 1, and then the distance between the left box ball 13 and the right box ball 14 can be reduced to reduce the width of the container 1. Removal of the extending guide rail 198 can avoid interference with the container 1 or other moving parts when adjusting the width of the container 1.

In some embodiment, one end of that top wall 18 is hinged with the left wall 13, and the other end of the top wall 18 is detachably connected with the right wall 14. When it is necessary to open the top of the container 1, it is only necessary to separate the top wall 18 from the right wall 14 and turn the top wall 18 to the outside of the left wall 13.

Figure 9:
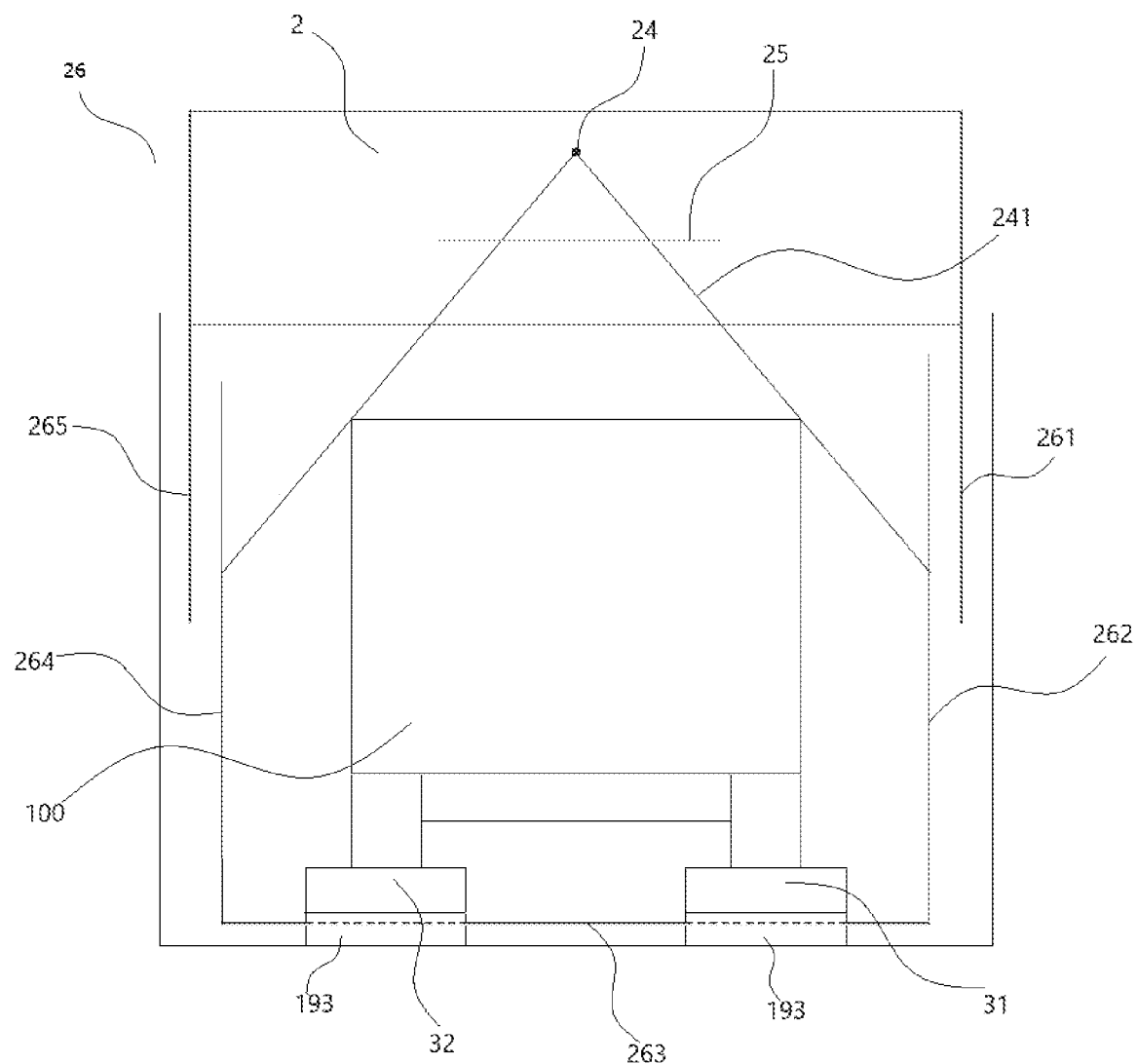
FIG. 9 is a partial structural schematic view of the radiation inspection device in the left view in the working state according to another embodiment of the present disclosure.

In some embodiments, as shown in FIGS. 6, 7 and 9, the radiation inspection apparatus 2 includes a first cabin 23 at the top and first and second support arms 21 and 22 supporting the first cabin 23 and located at both ends of the first cabin 23, and the heights of the first and second support arms 21 and 22 are adjustable. In this embodiment, the height of the radiation scanning channel of the radiation scanning inspection vehicle 100 under the radiation inspection apparatus 2 is adjustable by adjusting the heights of the first support arm 21 and the second support arm 22.

In some embodiments, as shown in FIGS. 6 and 7, the first support arm 21 and the second support arm 22 each include a first articulated arm 201 and a second articulated arm 202 that can slide relatively, and their respective heights are adjustable by the relative sliding of their respective first articulated arm 201 and second articulated arm 202. An oil cylinder can be arranged between the first section arm 201 and the second section arm 202. The cylinder barrel of the oil cylinder is fixedly connected with one of the first section arm 201 and the second section arm 202, and the piston rod of the oil cylinder is fixedly connected with the other of the first section arm 201 and the second section arm 202. The height of the first support arm 21 or the second support arm 22 is adjustable through the expansion and contraction of the oil cylinder.

In some embodiments, as shown in FIGS. 4 and 5, the container 1 includes a bottom wall 17, a top wall 18, a left wall 13 and a right wall 14 extending along the length direction, the left wall 13 and the right wall 14 are oppositely arranged along the width direction of the container 1, and the top wall 18 includes a multiple separate top plates 181; one end of the top plate 181 corresponding to the radiation inspection apparatus 2 is hinged with one of the left wall 13 and the right wall 14, and the other end of the top plate 181 is detachably connected with the other of the left wall 13 and the right wall 14.

In the embodiment shown in FIGS. 4 and 5, one end of the top plate 181 corresponding to the radiation inspection apparatus 2 is hinged with the left wall 13. When it is necessary to raise the radiation inspection apparatus 2 so that the radiation inspection apparatus 2 can extend out of the container 1, the top of the container 1 corresponding to the radiation inspection apparatus 2 can be opened by flipping the top plate 181 corresponding to the radiation inspection apparatus 2, so that the radiation inspection apparatus 2 can normally extend out.

In some embodiments, as shown in FIG. 7, the radiation inspection apparatus 2 includes a first cabin 23 at the top, and the size of the first cabin 23 in the width direction of the container is adjustable. This arrangement can adjust the width of the inspection channel of the radiation inspection apparatus 2, so that vehicles 100 with various widths can be inspected.

In some embodiments, as shown in FIG. 7, the first cabin 23 includes a first sub-cabin 231, a second sub-cabin 232 and a third sub-cabin 233 connected in sequence. The radiation source 24 is arranged in the second sub-cabin 232. Both the first sub-cabin 231 and the third sub-cabin 233 are relatively slidable relative to the second sub-cabin 232. The first cabin 23 slides relative to the second cabin 232 through the first sub-cabin 231 and/or the third sub-cabin 233 to adjust the length of the first cabin 23 in the container width direction. This arrangement can adjust the length of the first cabin 23 in the width direction of the container. Since the radiation source 24 is arranged in the second sub-cabin 232, the position of the radiation source 24 located in the middle of the first cabin 23 can be kept basically stable, which is helpful to maintain the functional stability of the radiation inspection apparatus 2.

In some embodiments, the first cabin is also provided with a collimator 25 configured to collimate radiation rays 241 emitted by the radiation source 24.

In some embodiments, as shown in FIG. 9 (the structures such as the first support arm 21 and the second support arm 22 are omitted in FIG. 9, and only the structural arrangement of the detector is shown schematically), the detector 26 includes a first detection arm 261 arranged on the first articulated arm of the first support arm 21, a second detection arm 262 arranged on the second articulated arm of the first support arm 21, a third detection arm 263 arranged on the bottom wall 17 of the container 1, and a fourth detection arm 264 arranged on the second articulated arm of the second support arm 22, and a fifth detection arm 265 arranged on the first articulated arm of the second support arm 22.

In some embodiments, all the walls of the container 1 are radiation-proof walls.

It should be explained that the above embodiments are only used to illustrate the embodiments of the present disclosure, but not to limit it; Although the present disclosure has been described in detail with reference to embodiments, those skilled in the art should understand that the specific embodiments of the present disclosure can still be modified or some features can be replaced by equivalents.

What is claimed is:

1. A radiation inspection device having a transportation state and a working state, wherein the radiation inspection device comprises:
    a container with an adjustable width, wherein a width of the container in the transportation state is smaller than that in the working state;
    a radiation inspection apparatus arranged in the container and comprising a radiation source and a detector, wherein in the transportation state, a length of the radiation inspection apparatus is arranged along a length direction of the container; in the working state, the length of the radiation inspection apparatus is arranged along a width direction of the container to perform radiation scanning inspection on a vehicle passing through the container along the length direction; and
    a rotating apparatus arranged in the container and configured to rotate the radiation inspection apparatus when the radiation inspection device is switched between the transportation state and the working state, and the rotating apparatus comprising a rotating part arranged on the container and configured to provide power for rotating the radiation inspection apparatus.

2. The radiation inspection device according to claim 1, wherein the container comprises a bottom wall, a top wall, a left wall and a right wall extending along the length direction of the container; the left wall and the right wall are oppositely arranged along the width direction of the container; the radiation inspection device further comprises a driving apparatus configured to adjust the distance between the left wall and the right wall to adjust the width of the container when the radiation inspection device is switched between the transportation state and the working state.

3. The radiation inspection device according to claim 2, further comprising a first sliding part and a second sliding part which are located at both opposite ends of the bottom wall and are respectively slidably connected with the bottom wall, wherein the first sliding part is connected with the left wall, and the second sliding part is connected with the right wall; the driving apparatus is drivingly connected with the first sliding part and the second sliding part, and is configured to drive the first sliding part and the second sliding part to slide relative to the bottom wall to adjust the width of the container.

4. The radiation inspection device according to claim 1, wherein the radiation inspection device comprises a conveying apparatus arranged in the container, and the conveying apparatus is configured to convey a vehicle in the container in the working state so that the vehicle passes through a radiation scanning channel of the radiation inspection apparatus.

5. The radiation inspection device according to claim 4, wherein the conveying apparatus comprises a first conveyor and a second conveyor extending along a length direction of the container; the first conveyor and the second conveyor are arranged at intervals along a width direction of the container, and a distance between the first conveyor and the second conveyor is adjustable.

6. The radiation inspection device according to claim 1, wherein,
    the container comprises a bottom wall, a top wall, a left wall and a right wall extending along the length direction of the container; the left wall and the right wall are oppositely arranged along the width direction of the container; a distance between the left wall and the right wall is adjustable;
    the container further comprises a first supporting part and a second supporting part fixedly connected with the left wall and the right wall respectively, and the radiation inspection apparatus is supported on the first supporting part and the second supporting part in the working state;
    the rotating apparatus comprises a support frame arranged on the container; in the transportation state, the support frame is detachably connected between the rotating part and the radiation inspection apparatus; the radiation inspection apparatus is supported on the support frame; when the radiation inspection device is switched between the transportation state and the working state, the rotating part rotates the radiation inspection device through the support frame.

7. The radiation inspection device according to claim 6, wherein the support frame comprises a plurality of follow-up legs, and the follow-up legs are supported on the bottom wall in the transportation state.

8. The radiation inspection device according to claim 6, wherein the first supporting part and the second supporting part both comprise arc-shaped guide rails, and the arc-shaped guide rail comprises a fixed guide rail fixedly connected with the container and an extending guide rail detachably connected with the fixed guide rail; the extending guide rail is separated from the fixed guide rail and the radiation inspection apparatus, and is fixedly connected with the fixed guide rail when the radiation inspection device is switched between the transportation state and the working state; the fixed guide rail and the extending guide rail guide the rotation of the radiation inspection apparatus.

9. The radiation inspection device according to claim 1, wherein the radiation inspection apparatus comprises a first cabin located at the top of the container, and a first support arm and a second support arm which support the first cabin and are located at two ends of the first cabin; the first support arm and the second support arm are configured to be adjustable in height so that the position of the first cabin in the transportation state is lower in height than that in the working state.

10. The radiation inspection device according to claim 9, wherein the first support arm and the second support arm both comprise a first articulated arm and a second articulated arm being slidable relatively, and the first support arm and the second support arm adjust their respective heights through the relative sliding of the respective first articulated arm and second articulated arm.

11. The radiation inspection device according to claim 1, wherein the container comprises a bottom wall, a top wall, a left wall and a right wall extending along the length direction, and the left wall and the right wall are oppositely arranged along the width direction of the container; the top wall comprises multiple separate top plates, and one end of each of the top plates corresponding to the radiation inspection apparatus is hinged with one of the left wall and the right wall, and the other end of the top plate detachably connected with the other of the left wall and the right wall.

12. The radiation inspection device according to claim 1, wherein the radiation inspection apparatus comprises a first cabin located at the top of the container, and the size of the first cabin the width direction of the container is adjustable.

13. The radiation inspection device according to claim 12, wherein the first cabin comprises a first sub-cabin, second sub-cabin and a third sub-cabin which are connected in sequence; the radiation source is arranged in the second sub-cabin; both the first sub-cabin and the third sub-cabin are slidable relative to the second sub-cabin, and the first cabin slides relative to the second sub-cabin through the first sub-cabin and/or the third sub-cabin to adjust the size of the first cabin in the width of the container.

14. The radiation inspection device according to claim 1, wherein a wall of the container is a radiation-proof wall.

* * * * *